United States Patent Office 3,383,429
Patented May 14, 1968

3,383,429
PROCESS FOR DEHYDROGENATING
HYDROCARBONS
Charles R. Noddings, Midland, Mich., assignor to The
Dow Chemical Company, Midland, Mich.
No Drawing. Continuation-in-part of application Ser. No.
448,287, Apr. 15, 1965. This application Mar. 1, 1967,
Ser. No. 619,596
14 Claims. (Cl. 260—669)

ABSTRACT OF THE DISCLOSURE

This invention relates to an improved process for dehydrogenating saturated aliphatic and monoolefinic hydrocarbons to produce olefins and diolefins by passing the hydrocarbons over a calcium nickel phosphate catalyst in the presence of steam, oxygen, and bromine or a bromine yielding compound.

Cross reference to related applications

This application is a continuation-in-part of our earlier filed application Ser. No. 448,287 entitled, Process for Dehydrogenating Hydrocarbons, now abandoned.

Background of invention

It is well known that saturated aliphatic hydrocarbons, particularly butane, can be dehydrogenated to their corresponding monoolefins over $Cr_2O_3$ on alumina catalysts under vacuum. It is further well known that the monoolefins, particularly butene, can be further dehydrogenated over various catalysts such as calcium nickel phosphate or stabilized and promoted iron oxide in the presence of steam to yield conjugated dienes. In each of these latter processes the ratio of steam to hydrocarbon is usually commercially from 10 to 20 or more steam to hydrocarbon. Although on laboratory scale and under certain feed stock conditions lower steam ratios can be used it is normally not commercially economical due to lower yields and selectivities which are obtained. Further in some of such processes the reactors must be used in pairs, one on hydrocarbon feed, the other on regeneration. The catalyst activity has been increased by the use of shorter cycles of somewhat less than ½ hour. These improvements have resulted from changes in equipment and process conditions not from changes in catalyst structure.

These prior processes have all produced good yields of dienes, principally butadiene, but in view of the increasing cost of plants, feedstock, catalyst, steam and labor, it has become necessary to find a more economical process for the preparation of these dienes, principally butadiene. Since butadiene is the principal diene hydrocarbon desired today, reference hereinafter will be made primarily to the production of that compound. However, it is to be fully understood that what is said about butadiene also applies with reference to the production of other olefins and dienes such as isoprene, as well as vinyl aromatics such as styrene and the like, and to mixtures of different hydrocarbons and the like.

As has been previously stated, many processes are known utilizing various catalyst materials for dehydrogenating the alkanes or the alkenes to produce dienes. One such process is taught in U.S. Patent 2,442,320, comprises dehydrogenating a monoolefine by passing the olefine together with steam at a dehydrogenation temperature which is below the carbonization temperature, through a bed of catalytic material consisting of a normal metal phosphate formed in a non-acidic aqueous medium and composed of calcium and nickel chemically combined with phosphate radicals, the ratio of calcium to nickel being within the range of 7.15 to 12 atoms of calcium per atom of nickel and chromium oxide. The process requires periodic regeneration of the catalyst. Through the years, many improvements have been made in the process and catalyst as evidenced by the following patents; U.S. Patent No. 2,442,319, Process and Catalyst for Dehydrogenation of Olefines; U.S. Patent No. 2,456,367, Calcium Nickel Phosphate Catalyst and Preparation Thereof; U.S. Patent No. 2,456,368, Calcium Nickel Phosphate Chromium Oxide Catalyst; U.S. Patent No. 2,542,813, Manufacture of Catalyst; 2,816,081, Preparation of Metal Phosphate Catalysts; 2,824,843, Treatment of Calcium Nickel Phosphate Containing Catalysts; 2,884,473, Method of Dehydrogenating Hydrocarbons using a Calcium Nickel Phosphate Catalyst; 2,933,543, Calcium Nickel Phosphate of High Crushing Strength; 2,945,900, Catalytic Dehydrogenation of Hydrocarbons, the latter patent teaching the use of 5 to 40% by volume, based on hydrocarbon, of uncombined oxygen; and 2,996,557, Catalytic Dehydrogenation Method. All of these processes require regeneration of the catalyst at regular intervals by burning off the accumulated carbon. These processes suggest the more frequent the regeneration the better the yields, conversions, and selectivity. Most of the improvements set forth in the above patents contributed materially to the availability of butadiene particularly, for synthetic rubber production. Many other improvements both in these processes, as well as in the preparation of the precursor butylenes, too numerous to mention, have contributed materially to the ready availability of inexpensive but superior rubbers for tires and the like.

It is an object of the present invention to provide a process whereby butadiene and other dienes can be prepared in higher concentrations at lesser expenditure of values than previously obtainable with known process. Another object of the present invention is to provide a process whereby both alkanes and alkenes can be individually or simultaneously dehydrogenated to dienes in commercially economical quantities. A still further purpose of the present invention is to provide a process whereby less utilities are required to obtain yields of dienes equivalent or superior to those obtainable in present day processes. Another object of the present invention is to provide an improved process whereby alkaryl hydrocarbons can be dehydrogenated or the aliphatic hydrocarbons reacted to form cyclic structures both aromatic and aliphatic. It is a still further object of the present invention to provide a continuous process for the dehydrogenation of alkanes and alkenes to products having a degree of unsaturation greater than the starting materials. These and other objects will become apparent to those skilled in the art from the following description and claims.

Summary of invention

The present invention comprises passing in vapor phase (1) a hydrocarbon, selected from the group consisting of aliphatic, alicyclic and phenylaliphatic hydrocarbons, having not more than one olefinic double bond and having at least two adjacent saturated aliphatic carbon atoms each bearing at least one hydrogen atom with (2) steam, (3) oxygen or an oxygen-containing gas (air) in the presence of (4) bromine or a bromine-yielding compound (the term bromine as used hereinafter shall mean elemental bromine or bromine from a bromine yielding source such as an inorganic bromide or an alkyl bromide) into contact with a calcium nickel phosphate catalyst, which may have from 0.5 to 5 percent chromic oxide dispersed throughout, at a temperature of from 400° to about 700° C. and maintaining said hydrocarbon in contact with said catalyst for a period of time sufficient to effect a dehydrogenation of a substantial quantity of the hydrocarbon to its corresponding olefin or diene or a mixture thereof. The result is achieved by maintaining the hydrocarbon, steam, oxygen and bromine in a molar ratio of from 1 to 1 to .25 to 0.002, respectively, through the ratio of 1 to 40 to 3 to 0.30, respectively. The relative amount of bromine is preferably between about 1 to 20 mole percent based on hydrocarbon. The catalyst is conveniently prepared in the manner of U.S. Patent Nos. 2,442,319; 2,442,320; 2,456,367; 2,456,368; 2,542,813; 2,816,081 and/or 2,824,843, and in a manner to provide 7 to 12 atoms of calcium per atom of nickel. The bromine, which is required for the successful operation of the present process, must be introduced as free bromine or as a compound capable of decomposition to yield free bromine, e.g., organic bromine compounds or inorganic bromine compounds such as for example, 1,2-dibromobutane, 1,2,3-tribromo propane, $NH_4Br$ or HBr, under the conditions of reaction.

Description of preferred embodiments

The process of the present invention is operated for relatively long periods of time without necessity of regeneration and preferably continuously. The process equipment is essentially that employed in present day butadiene plants except that only one reactor is now necessary per train. Having described in generic terms the process of the present invention, the following description with reference to the flow diagram is set forth.

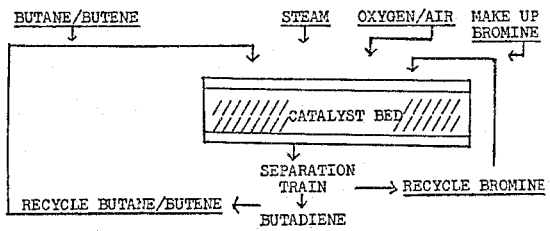

Butane, butene, or a mixture thereof is fed along with steam, and oxygen or air to a reactor containing a calcium nickel phosphate catalyst (prepared, for example, in the manner described in U.S. Patent No. 2,542,813 and containing $Cr_2O_3$), preheated by sweeping with steam to the desired reaction temperature, that is, between 400° and 700° C. and preferably between 450° and 550° C. The preferred manner of operation is hereafter described although it is to be understood wide variations in technique can be employed without substantial loss of the advantages. The hydrocarbon containing gas is admixed with steam which has been superheated to a temperature sufficient so that the resultant mixture is at the desired temperature. However, the heat may be supplied in other ways, for example, using preheaters, or by externally heating the catalyst chamber itself.

It is to be understood that when operating at or near the maximum capacity for a particular system, it is sometimes advantageous to heat-treat the catalyst bed periodically, by raising the temperature from several degrees to 100 degrees above operating temperature after cutting off the flow of hydrocarbon, bromine and oxygen.

The steam may be used in amounts sufficient to moderate the temperature rise of the reactants and products through the reaction zone. Generally, 10 to 20 volumes of steam per volume of hydrocarbon are sufficient.

The bromine required to obtain efficient and successful operation of the present process is initially introduced into the catalyst zone either as a decomposable bromine compound or with the gaseous feed as elemental bromine or hydrogen bromide. Once the bromine required for the particular operation is in the system, very small quantities are carried out and thus only periodic introduction of make-up bromine is required; it being understood that bromine leaving the reactor is recovered and recycled.

It is to be clearly understood that the process is preferably operated in a continuous manner. However, it is also to be understood that even when operated in a non-continuous manner certain economics can still be realized and conversions and selectivities per pass remain high although it is apparent overall efficiencies will be lower by at least the services used during regeneration or holding without feed.

The amount of oxygen employed in operations of the present invention ranges from about 50 to 300 percent of that theoretically capable of reacting with the theoretical hydrogen removed to obtain the desired product. Preferably, however, the oxygen is employed in from betwent about 170 to 190 percent of that stoichiometrically required to produce the desired product or products.

The space velocity of the reactants or reactant hydrocarbon can vary from about 50 to 500 volumes of hydrocarbon per volume of catalyst per hour. Preferably, the space velocity of the reactant or reactants varies from about 100 to about 300 v./v./hour.

It is apparent to those skilled in the art the advantages which are obtained by the present process. However, certain advantages are obtained which are not apparent on the face of the process. Operations carried out over several months indicate deterioration of catalyst to be very minor.

Several runs have been made with various catalyst batches, under various steam, oxygen and bromine ratios, alkane to alkene ratios, various temperatures, etc. The following examples illustrate the flexibility of the operations and the improvement over the present day process, but are not to be construed as limiting.

Examples 1-10

A vapor mixture of steam, cracked-oil-gas consisting of for the most part aliphatic hydrocarbons containing 4 carbon atoms, or pure butane, or butene or mixture of the latter two pure gases, oxygen and various sources of bromine was passed in continuous flow through a 1 inch I.D. 446 S.S. or silica tubular reactor containing 150 or 525 cubic centimeters of a calcium nickel phosphate catalyst containing 2 percent chromium oxide (except Example No. 5) and prepared in accordance with U.S. Patent No. 2,542,813. The catalyst chamber was heated to provide substantially isothermal conditions. The ratio of gases, steam, oxygen, and bromide introduced, the temperature and the composition of the vapors issuing from the bed of catalyst as percent conversion of $C_4H_8$ and $n-C_4H_{10}$ to butadiene are set down in Table I below. The vapors issuing from the catalyst bed were cooled in stages to condense the water vapor and then condense the hydrocarbons. The bromine in these vapors is recovered mostly as HBr. The reaction in the following examples was carried out at one atmosphere pressure, absolute, measured at the outlet.

In another set of runs ethylbenzene was dehydrogenated to styrene under similar conditions. The results are set forth in Table II.

As used herein, the following abbreviations have the meaning:

Percent C means the percent of the named reactant lost, i.e., conversion per pass Percent S means the percent of the lost material converted to desired product, mole basis, i.e., selectivity Percent Y means $$\frac{(\text{Percent C} \times \text{Percent S})}{100},$$

i.e., yield per pass.

TABLE I

| Ex. | V./v./hour[1] | | | | Steam | Temp., °C. | Percent C of Butene-1 | n-Butane | Total percent | | |
|---|---|---|---|---|---|---|---|---|---|---|---|
| | Butene-1[1] | n-Butane | O$_2$ | Bromine Amt. and Source | | | | | C | S | Y |
| (1) | (2) | (3) | (4) | (5) | (6) | (7) | (8) | (9) | (10) | (11) | (12) |
| 1;N | 162 | 158 | 230 | 1.1 1,2,3-tribromopropane | 6,300 | 550 | 37.8 | 7.2 | 22.6 | 90.8 | 20.6 |
| 2;O | 138 | 157 | 230 | 0.6 1,2,3-tribromopropane | 6,000 | 580 | 53.4 | 11.8 | 31.3 | 86.5 | 27.0 |
| 3;P | 59 | 64 | 74 | 0.9 1,2,3-tribromopropane | 2,600 | 580 | 71.8 | 12.8 | 41.0 | 80.3 | 33.0 |
| 4;Q | 69.4 | 77.5 | 100 | 3.2 1,2-dibromobutane | 3,200 | 500 | 61.4 | 25.0 | 42.1 | 92.0 | 38.8 |
| 5;R[2] | 75.3 | 84 | 100 | 3.2 1,2-dibromobutane | 3,000 | 500 | 58.2 | 22.2 | 39.2 | 93.3 | 36.5 |
| 6;GA | 162 | 0 | 100 | 1.0 from 1-2,dibromobutane | 3,000 | 500 | 57.1 | 0 | 57.1 | 97.3 | 55.4 |
| 7;LU | 149 | 0 | 589 air | 3.5 as bromine elemental | 3,000 | 625 | 79.1 | 0 | 79.1 | 93.0 | 73.6 |
| 7;74[4] | 0 | 17 | 188 | 9.3 from 1,2-dibromobutane | 2,900 | 485 | 0 | 65.6 | 65.6 | 85.9 | 56.3 |

[1] V./v./hour represents the space velocity in volumes at 0° C. and 1 atm. of the named component per volume of catalyst per hour.
[2] 150 cm.³ catalyst bed.
[3] No chromic oxide.
[4] 300 cm.³ catalyst bed.

TABLE II

| Ex. | V./v./hour[1] | | | Steam | Temp., °C. | Total Percent | | |
|---|---|---|---|---|---|---|---|---|
| | Ethyl benzene | O$_2$ | Bromine Amt. and Source | | | C | S | Y |
| 8;AC | 203 | 130 | 7.1 1,2-dibromobutane | 3,300 | 590 | 71.3 | 92.5 | 65.9 |
| 9;AD | 201 | 310 | 21.4 1,4-dibromobutane | 3,400 | 590 | 95.5 | 89.4 | 95.3 |
| 10;AE | 185 | 130 | 21.4 1,4-dibromobutane | 3,300 | 590 | 74.3 | 92.2 | 68.5 |

[1] 525 cm.³ catalyst bed.

Example 11

A conventional calcium nickel phosphate catalyst prepared as aforedescribed in Example 5 was precipitated onto a montmorillonite clay (Super Filtrol) contained in suspension in the reaction vessel to produce on settling a catalyst having 50 weight percent active phosphate on clay; then extruded into ¼ inch diameter cylinders which were cut into ¼ inch long pellets. The so prepared catalyst was employed as the catalyst bed in a process similar in all respects to Example I. The results were:

l-C$_4$H$_8$ --- percent C -- 46
n-C$_4$H$_{10}$ --- percent C -- 11
Total feed --- percent C -- 27
To 1,3 C$_4$H$_6$ --- percent S -- 72
Per pass --- percent Y -- 20

The conversion and yields obtained by the present process have been found to be enhanced after prolonged usage by heat-treating the catalyst bed at temperatures of from 350° to about 700° C. for from 1 to six hours in the presence of steam only after about one week to one month operation.

Example 12

The catalyst of Example 6 was found to have conversions, yields and selectivities as set forth below on a butane feed at 450° C. After heat treating the bed at 450° C. for 6 hours the conversions, etc. set forth were obtained.

| | Last two hours of 1-39 hours | Last two hours of 114-122 hours of cont. operation | Steam heat treatment | Last two hours of 123-141 hours of cont. operation |
|---|---|---|---|---|
| Percent C C$_4$H$_{10}$ | 68 | 36 | 6 hours | 53 |
| Percent S 1,3-C$_4$H$_6$ and C$_4$H$_8$ | 78 | 89 | do | 93 |
| Percent Y per pass | 53 | 32 | do | 49 |
| Percent C$_4$H$_6$ in Dry Ice Trap | 49 | 24 | do | 42 |
| Percent C$_4$H$_8$ in Dry Ice Trap | 12 | 9 | do | 9 |

Example 13

The following table illustrates the effects obtained upon conversion and selectivity of butane to butadiene employing the present process and various ratios of Br$_2$ to hydrocarbon and the same catalyst as in Example 6.

| Reactor vol, cm.³ catalyst bed | 425 | | 300 | | |
|---|---|---|---|---|---|
| Hydrocarbon, v./v./hr | 120 | | 170 | | |
| Oxygen v./v./hr | 80 | 130 | 188 | | |
| Temperature, °C | 500 | 450 | 485 | | |
| Ratio Br/HC, m./m | 0.011 | 0.032 | 0.061 | 0.09 | 0.054 |
| Percent C n-C$_4$H$_{10}$ | 30 | 49 | 53 | 58 | 66 |
| Percent S to 1,3-C$_4$H$_6$ and C$_4$H$_8$ | 82 | 87 | 88 | 90 | 86 |
| Percent Y per pass | 24 | 43 | 47 | 53 | 56 |

Example 14

The present process also has utility to produce isobutene from isobutane. The following runs illustrate this utility.

Catalyst—same as Example 1
Reactor—same as Example 1
Temperature 450° C.

| Run No | V./v./hour | | | |
|---|---|---|---|---|
| | 1 | 2 | 3 | 4 |
| Component: | | | | |
| n-C$_4$H$_{10}$ | | | 79.1 | |
| iso-C$_4$H$_{10}$ | 138.1 | 133.2 | 61.9 | 70.8 |
| n-C$_4$H$_8$ | | | | 76.2 |
| Br$_2$ | 2.82 | 7.16 | 2.71 | 3.2 |
| O$_2$ | 93.3 | 93.3 | 137 | 93.3 |
| Percent C iso-C$_4$H$_{10}$ | 22.8 | 29.1 | 38.8 | 9.2 |
| Percent C n-C$_4$H$_{10}$ or C$_4$H$_8$ (as appl.) | | | 44.8 | 54.8 |
| Percent S to 1,3-C$_4$H$_6$ and C$_4$H$_8$ | 8.5 | 18.4 | 77 | 79.3 |
| Percent S to iso-C$_4$H$_8$ (based on i-C$_4$H$_{10}$ as sole reactant) | 59.5 | 42.7 | 30.6 | 116.7 |
| Percent Y 1,3-C$_4$H$_6$ and n-C$_4$H$_8$ | 1.9 | 5.4 | 34.5 | 43.5 |
| Percent Y iso-C$_4$H$_8$ | 13.6 | 12.4 | 11.9 | 10.7 |

It is thus seen that one can obtain values from the iso content of a feed.

Other feeds which have been employed and found to give comparable results are iso-butane, iso-pentane and n-heptane, producing iso-butene, isoprene, and heptadiene and aromatic toluenes, respectively.

Feeds which can be employed in accordance with the present invention are ethane, propane, butane, butene, pentane, pentene, hexane, hexene, ethyl pentane, ethyl hexane, heptane, heptene, octane, octene and ethyl benzene. It is to be understood that the compounds have at least two adjacent saturated aliphatic carbon atoms each bearing at least one hydrogen atom.

Examples 15 to 23

The following table sets forth the data obtained employing a commercially available calcium nickel phosphate catalyst which contained 2% chromium oxide and was from the same catalyst batch as Examples 1–10. The catalyst bed contained 150 cc. of catalyst. The first five Examples 15, 16, 17, 18 and 19 were run to obtain comparative data. These examples illustrate the ineffectiveness of the catalyst and process to convert the alkanes even when the halogens chlorine or iodine are present. The data illustrates the unexpectedness of using bromine in the present process in the ability of the catalyst to convert alkanes and the much reduced CO and $CO_2$ production as compared to no halogen nor oxygen, only oxygen, or using oxygen in combination with chlorine or iodine.

EXAMPLES 15–23.—ANALYSIS OF FEED AND PRODUCTS IS BASED ON TOTAL FOR RUN OF DURATION INDICATED

| | Comparative Data | | | | | Present Invention | | | |
|---|---|---|---|---|---|---|---|---|---|
| Experiment | DH | DF | DG | CW | FJ | CV | DC | EP | DB |
| Example | 15 | 16 | 17 | 18 | 19 | 20 | 21 | 22 | 23 |
| Halogen Source | None | None | 1,2-di-bromo-butane | $Cl_2$ | 1-iodo butane | $Br_2$ | 1,2-di-bromo-butane | 1,2-di-bromo-butane | 1,2-di-bromo-butane |
| Feed (v./v./hr.): | | | | | | | | | |
| 1-$C_4H_8$ | 71.9 | 66.9 | 70.8 | 63.5 | 72.2 | 63.5 | 68.2 | 69.8 | 61.9 |
| n-$C_4H_{10}$ | 80.0 | 74.4 | 78.7 | 74.8 | 80.7 | 74.8 | 75.8 | 78.1 | 67.7 |
| $O_2$ | 0 | 79.1 | .0 | 95 | 186.7 | 95 | ²79.1 | 93.3 | 133.3 |
| Halogen, as $Cl_2$, $Br_2$ or $I_2$ | 0 | 0 | 1.4 | 2.9 | 3.0 | 2.4 | 1.5 | 2.0 | 1.4 |
| Steam | 2,120 | 2,210 | 2,160 | 3,000 | 3,200 | 3,100 | 2,230 | 3,060 | 2,390 |
| T., °C | 470 | 473 | 470 | 470 | 500 | 470 | 470–475 | 500 | 472 |
| Hours at constant conditions | 3 | 5 | 4 | 16 | 3 | 10 | 113 | 8 | 2 |
| Results: | | | | | | | | | |
| Percent C 1-$C_4H_8$ | 9.2 | 56.4 | 8.1 | 9.5 | 81.2 | 54.7 | 56.8 | 59.5 | 75.3 |
| Percent C n-$C_4H_{10}$ | 3.4 | 1.7 | 4.1 | 8.1 | 12.9 | 30.5 | 25.0 | 22.8 | 36.5 |
| Percent C Total | 6.2 | 27.6 | 6.1 | 8.7 | 45.2 | 41.6 | 40.1 | 40.1 | 55.0 |
| Percent S to $C_4H_6$ | 60.6 | 71.0 | 83.0 | 77.6 | 88.3 | 88.1 | 89.6 | 87.4 | 85.8 |
| Percent Y of $C_4H_6$ | 3.7 | 19.6 | 5.0 | 6.8 | 39.9 | 36.6 | 35.9 | 35.1 | 47.2 |

¹ Air used to supply oxygen.

I claim:

1. The method of dehydrogenating hydrocarbons comprising continuously passing through a reaction zone a reactant hydrocarbon at a space velocity of from 50 to 500 volumes of hydrocarbon per volume of a catalyst per hour, said catalyst consisting essentially of a calcium nickel phosphate dehydrogenation catalyst while simultaneously passing through said reaction zone steam in an amount of from 1 to about 40 volumes per volume of hydrocarbon, oxygen in an amount of from .25 to 3 moles per mole of reactant hydrocarbon, and bromine in an amount of from 0.002 to .3 mole/mole of hydrocarbon and maintaining the reaction zone at a temperature of from about 400° C. to about 700° C.

2. The method of claim 1 wherein chromium oxide in an amount less than the weight of said metal phosphate material is employed.

3. In the method of claim 2 wherein said hydrocarbon is butylene.

4. In the method of claim 2 wherein said hydrocarbon is butane.

5. In the method of claim 2 wherein said hydrocarbon is butane and butylene.

6. In the method of claim 1 wherein said reactant hydrocarbon is ethylbenzene.

7. In the method of claim 3 wherein said oxygen is employed in from .85 to .95 mole per mole of butylene.

8. In the method of claim 4 wherein said oxygen is employed in from 1.20 to 1.90 moles per mole of butane.

9. In the method of claim 1 wherein said hydrocarbon is isopentane.

10. In a process for dehydrogenating aliphatic and ethylbenzene hydrocarbons of from 2 to 8 carbon atoms to their corresponding hydrocarbons having greater unsaturation, wherein the hydrocarbon is passed through a heated zone containing a calcium nickel phosphate dehydrogenation catalyst in the presence of steam, the improvement which consists of continuously feeding into a reactor said hydrocarbon and said steam in a molar ratio of from 1 to 10 to 1 to 20 respectively while simultaneously feeding with said steam from 1 to 20 mole percent based on the hydrocarbon of bromine derived from elemental bromine or a bromine yielding compound and about 170 to 190 percent of that oxygen theoretically capable of reacting with the theoretical hydrogen removed from the aliphatic hydrocarbon or hydrocarbons to obtain the desired diene, at a temperature of from about 450° to 550° C. and at a space velocity of said hydrocarbon of from about 100 to about 300 volumes per volume of catalyst per hour, said catalyst being prepared by co-precipitating the 6 to 12 atoms of calcium per atom of nickel and said phosphate from an aqueous slurry of water soluble calcium and nickel salts at a pH between 7 to 12.

11. In the process of claim 10 wherein said aliphatic hydrocarbon is butane.

12. In the process of claim 10 wherein said aliphatic hydrocarbon is a mixture of butane and butene.

13. In the process of claim 10 wherein said catalytic body contains 0–5% by weight $Cr_2O_3$.

14. In the process of claim 10 wherein said aliphatic hydrocarbon is isopentane.

References Cited

UNITED STATES PATENTS 3,207,806   9/1965   Bajars _____ 260—680

DELBERT E. GANTZ, *Primary Examiner.*

C. R. DAVIS, *Assistant Examiner.*